Figure 1:
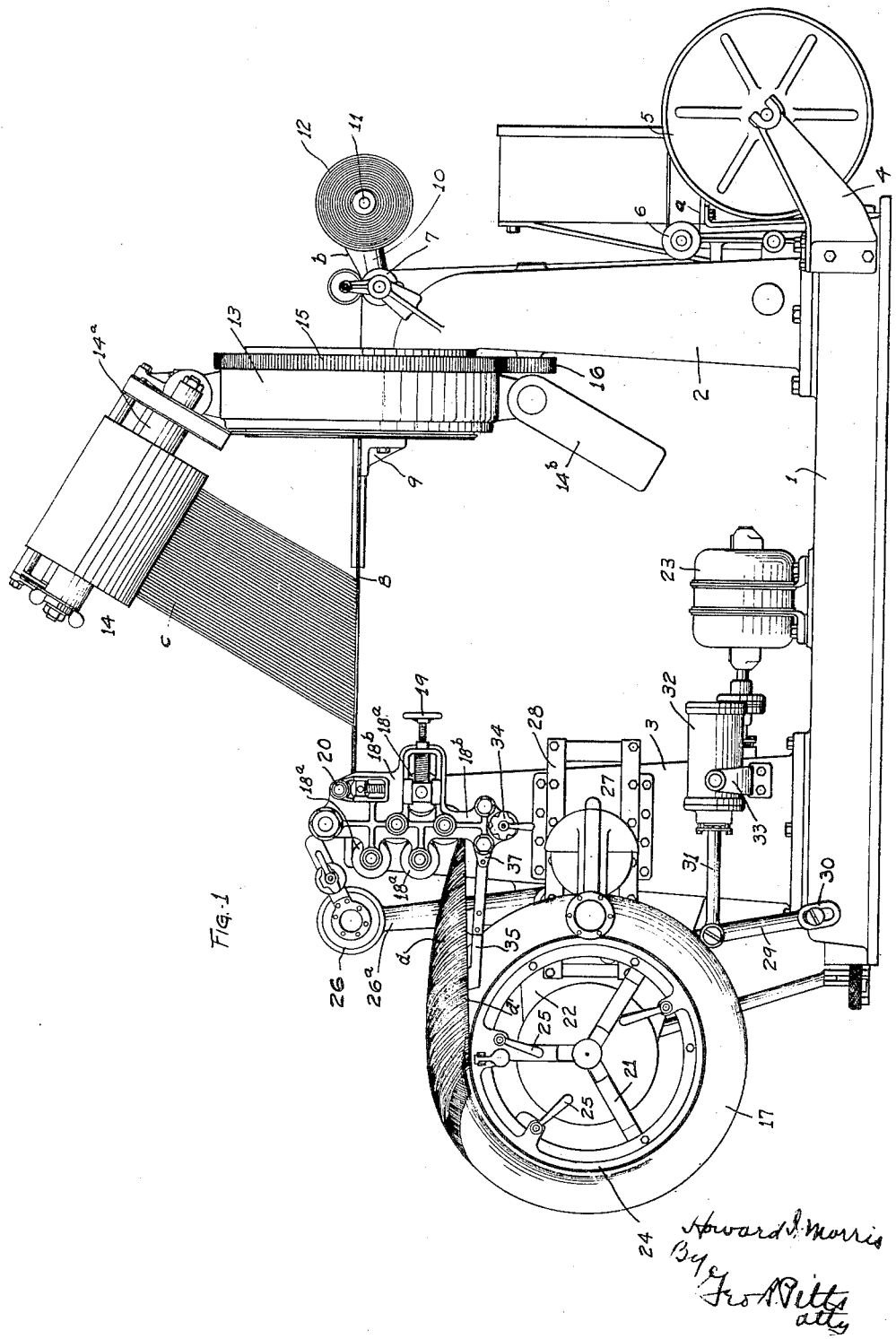

Feb. 12, 1929.

H. I. MORRIS 1,702,088

TIRE MAKING MACHINE

Filed Aug. 21, 1924    3 Sheets-Sheet 1

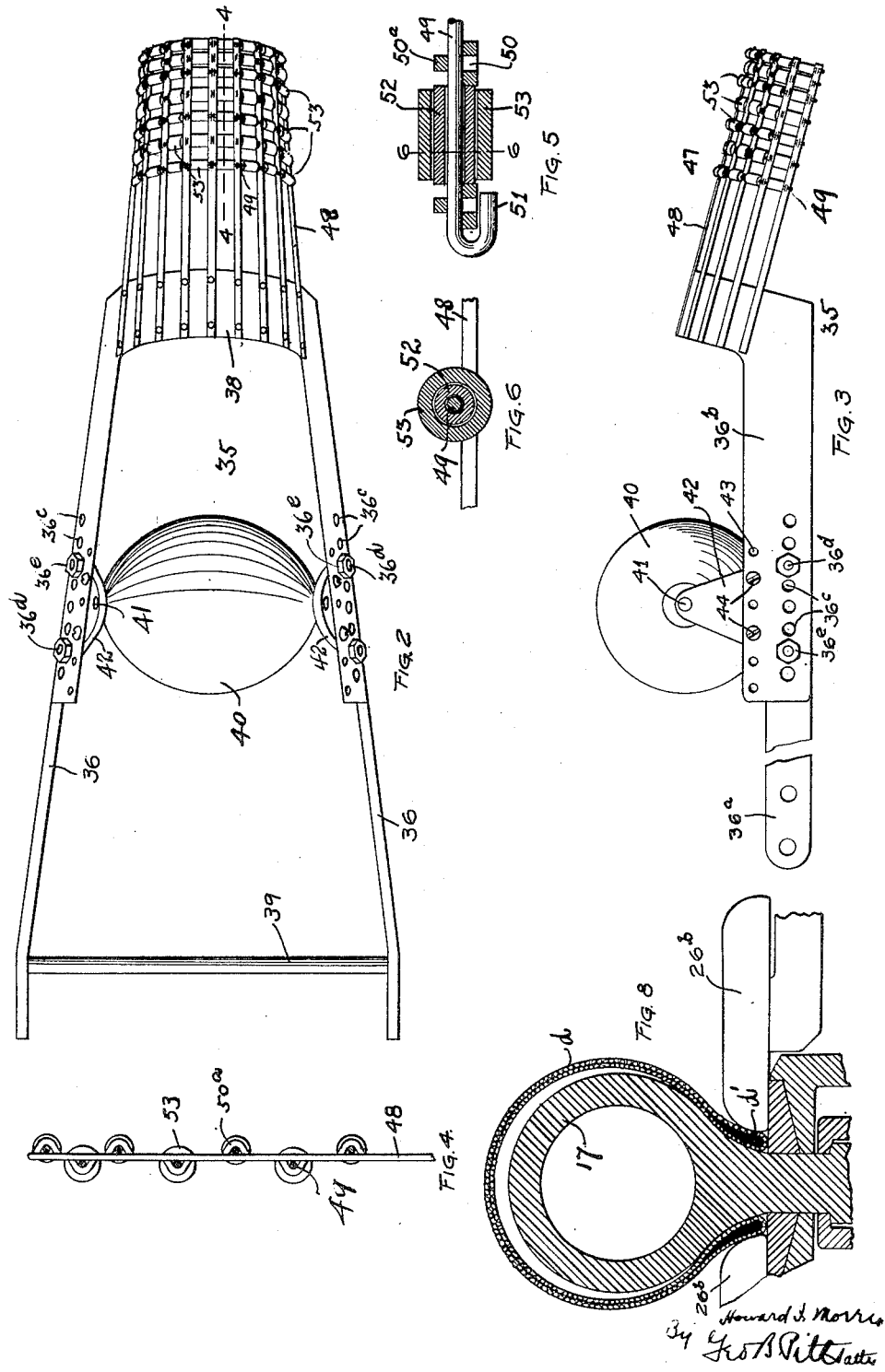

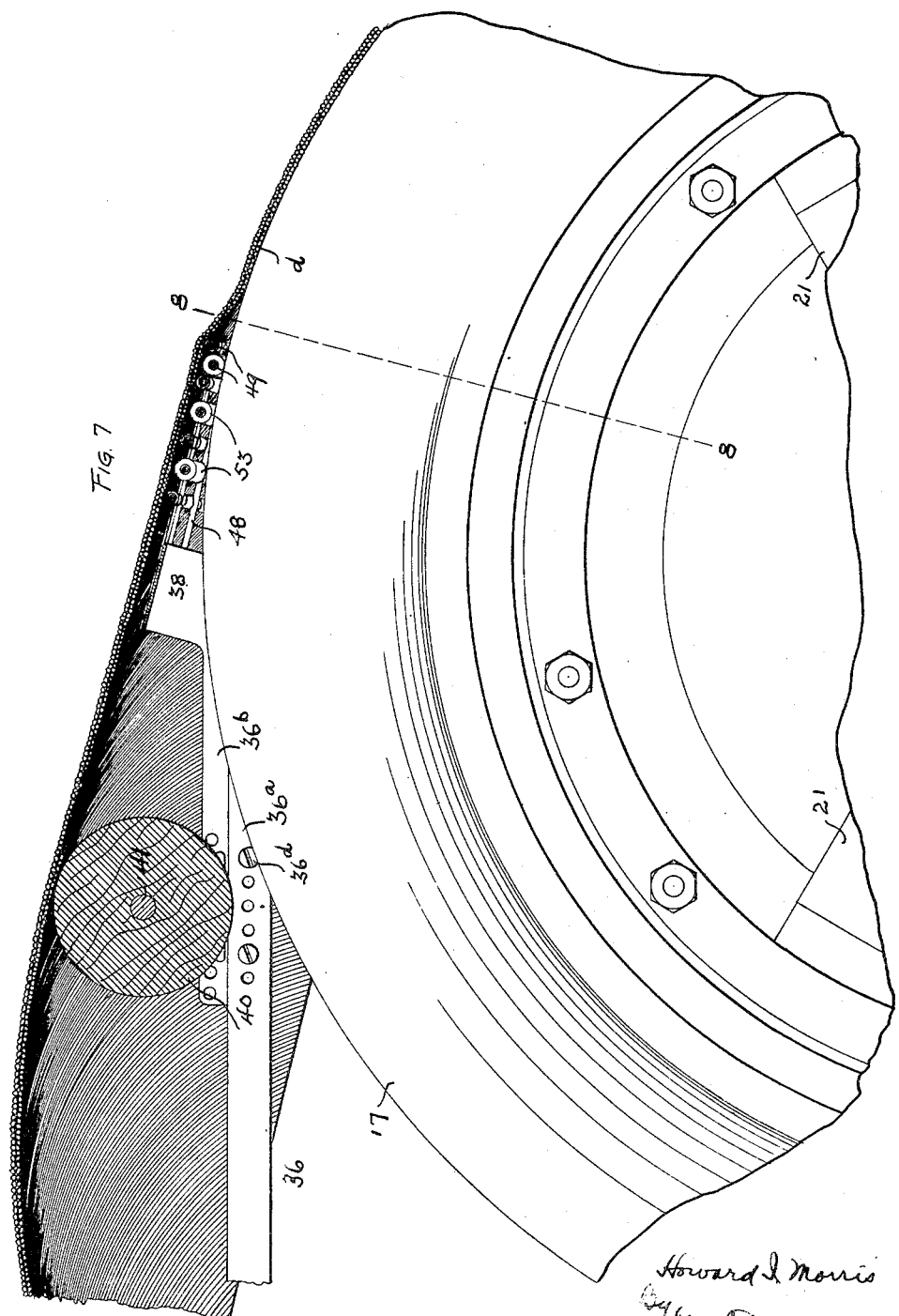

Patented Feb. 12, 1929.

1,702,088

UNITED STATES PATENT OFFICE.

HOWARD I. MORRIS, OF CLEVELAND, OHIO, ASSIGNOR TO THE CORD TIRE MACHINE COMPANY, OF CLEVELAND, OHIO, A CORPORATION OF ARIZONA.

TIRE-MAKING MACHINE.

Application filed August 21, 1924. Serial No. 733,450.

This invention relates to a machine for making tire carcasses of the type wherein a strip or web is wound on a rotatable member, it being particularly adapted for use in connection with a rotating member that is curved transversely, such as a core.

One object of the invention is to provide an improved guide shoe for the material, whereby it may be delivered to the rotatable member in a rapid manner without any distortion or wrinkling.

Another object of the invention is to construct a guide shoe capable of delivering the material to the desired point or points of contact with a rotatable winding member to insure proper positioning and smooth winding of the material thereon.

Another object of the invention is to provide a guide shoe of simple construction capable of (1) guiding the carcass material with minimum friction and (2) flexing transversely so as to deliver the material to a rotatable forming member without distorting it.

Other objects of the invention will be apparent to those skilled in the art to which my invention relates from the following description taken in connection with the accompanying drawings.

Fig. 1 is a side elevation of a tire carcass forming machine having a guide shoe for the material embodying my invention.

Fig. 2 is a top plan view of the guide shoe.
Fig. 3 is a side elevation of the guide shoe.
Fig. 4 is a section on the line 4—4 of Fig. 2.
Fig. 5 is a fragmentary section through one of the anti-friction rollers and adjacent arms.
Fig. 6 is a section on the line 6—6 of Fig. 5.
Fig. 7 is an enlarged fragmentary view showing the core and the feeding or delivery of the material over the shoe to the core (the bead roller on the near side of the core being omitted).
Fig. 8 is a section on the line 8—8 of Fig. 7.

I have, for illustrative purposes, shown my invention as applied to a machine for making tire carcasses wherein the material of which the carcass is made, is continuously fabricated into a composite web $d$ having beads $d'$ and the web is convolutely wound on a core to provide the carcass with the desired number of plies of material. This machine, a portion of which is shown in Fig. 1 of the accompanying drawings, forms the subject material of my co-pending application, Serial No. 705,654.

Referring to Fig. 1, 1 indicates a base of any desired construction and supporting standards 2, 3. 4 indicates brackets (only one being shown) supporting reels 5 on which are wound bead strips $a$ running around guide rolls 6 and 7 and positioning them at the opposite sides of the platen 8. The platen 8 is supported by a bracket 9, which forms a part of or is connected to the standard 2.

10 indicates an arm (only one being shown) supporting a shaft 11 on which are positioned webs 12 of material $b$ that is guided to the opposite sides of the platen 8 for association with the bead strips $a$.

13 indicates a shuttle rotatively mounted on the standard 2 and carrying a supporting means, indicated as an entirety at 14, having a shaft $14^a$ which supports a spool of sheet material at $c$, preferably comprising sheet rubber having embedded in it cords in parallel, side by side relationship. The supporting means 14 may be counter-balanced by a weight $14^b$ to neutralize the centrifugal forces set up by the rotation of the shuttle 13. The shuttle 13 is rotated by a suitable driving mechanism, elements of which comprise a gear 15 fixed to the ring member of the shuttle 13 and a pinion 16 meshing with the gear 15 and driven by a power mechanism (not shown). As the shuttle 13 rotates the sheet material $c$ is wrapped helically around the platen and spaced beads $a$ and strips of material $b$, the latter being folded over the beads, to associate these materials in position relative to each other for consolidation into a unitary composite web $d$ for delivery to and winding upon a core 17.

18 indicates as an entirety a consolidating and feeding mechanism, preferably comprising a plurality of rolls $18^a$, certain of which are driven, rotatably mounted at their inner ends in bearings provided on the standard 3, the outer ends of the rolls being rotatably mounted in a plate $18^b$ supported in spaced relation to the standard 3, and a pair of rolls 20 interposed between the rolls $18^a$ and the free end of the platen 8.

19 indicates devices for adjusting one of the rolls $18^a$ to increase the pressure thereof on the materials, to complete the consolidation thereof.

The core 17 is removably mounted upon a chuck 21 which in turn is supported upon and driven by a shaft rotatably mounted in bearings in a housing 22, which extends outwardly from the standard 3. The shaft for the chuck is driven through suitable driving connections by a motor 23 mounted on the base 1.

24 indicates bead rings (only one being shown) arranged to be clamped by devices 25 to the opposite sides of the core 17.

26 indicates as an entirety bead rolling down devices preferably mounted upon an arm 26$^a$ pivoted at its inner end to the standard 3. The rolling down devices include rollers 26$^b$, which engage the bead portions $d'$ of the web (see Fig. 8) to press them against the sides of the core 17. The construction of these devices and the mounting thereof form the subject matter of a separate co-pending application Ser. No. 750,127.

27 indicates as an entirety mechanism for rolling down the body portion of the web $d$ as it is found on the core 17. The rolling down mechanism 27 is slidably mounted in guides 28 carried by the standard 3 so as to move substantially in a radial direction toward and from the core 17. The rolling down mechanism 27 is connected to the free end of a lever 29, which is slidably and pivotally connected at its lower end to the base 1, as shown at 30. Intermediate its ends, the lever 29 is connected to a rod 31 which carries at its inner end a piston mounted in a cylinder 32. The cylinder 32 is provided with valved controlled ports for the admission of compressed air or other medium, whereby the rod 31 may be operated to swing the lever 29 and thus move the rolling down mechanism 27 into and out of operating position. The cylinder 32 is preferably trunnioned between the standard 3 and a bracket 33, so that it may accommodate itself to the position of the lever 29 as the latter is operated.

34 indicates a valve mechanism for controlling the compressed air to the bead rolling down devices 26, the body rolling down mechanism 27 and cylinder 32.

The body rolling down mechanism 27 forms the subject material of a separate co-pending application Ser. No. 736,349 for which reason further description thereof will not be necessary.

35 indicates as an entirety a guide shoe disposed between the consolidating mechanism 18 and the core 17 and arranged to guide the body portion of the web $d$ to the core, so that the bead portions $d'$ thereof may engage the sides of the core adjacent to the bead rings simultaneously with or prior to the engagement of the body portion of the web with the core.

Of the shoe 35, 36 indicates a pair of spaced arms pivotally mounted at their inner ends upon lugs 37 (only one being shown) supported by the standard 3 and plate 18$^b$. The arms 36 preferably converge so as to conform to the transverse width of the web $d$ as it takes on a transverse curvature during its feeding to the core 17, each of said arms being preferably formed of two strips 36$^a$, 36$^b$, the latter being connected at their outer ends by an arc shaped member 38 preferably formed integrally with the elements 36$^b$.

39 indicates a rod connected at its opposite ends to the inner ends of the arms 36 so as to maintain them in spaced relationship. The elements 36$^a$, 36$^b$, constituting each arm 36 may be rigidly secured together in overlapping relationship in any desired manner, but preferably in an adjustable manner, whereby the outer elements 36$^b$ may be moved endwise of the inner elements 36$^a$. For this purpose the elements are formed with series of openings 36$^c$ adapted to register with each other so that one or more bolts 36$^d$ may be inserted therethrough and engaged by nuts 36$^e$, thereby serving to clamp the elements 36$^a$, 36$^b$, in face to face engagement.

40 indicates a roller rotatably mounted between the arms 36 and substantially midway between the consolidating mechanism 18, or that roll 18$^a$ thereof from which the web $d$ is delivered, and the arc shaped member 38. The roll 40 is loosely mounted on a shaft 41 supported at its opposite ends in standards 42, each standard being adjustably connected at its lower end to the adjacent arm 36 in any desired manner, but preferably by the following instrumentalities: 43 indicate a series of openings formed in the element 36$^b$, and spaced to register with a pair of screw threaded openings formed in the adjacent bracket 42 so that screws 44 may be inserted therein and the bracket secured to the arm 36. By providing a plurality of openings 43 in each arm 36, it will be seen that the brackets 42 may be moved longitudinally of the arm 36 toward and from the delivery end of the shoe, so that the material will be supported at any desired point between the consolidating mechanism and the arc shaped member 38. The openings 43 are preferably formed in the strip 36$^b$, so that movement or adjustment thereof will also move or adjust the roller 40 with it, since in most instances it will not be necessary to adjust the roller relative to the delivery end of the shoe, altho this is provided for, as above set forth. To provide for the openings 43, the elements 36$^b$ are made somewhat wider than the element 36$^a$.

47 indicates a flexible shoe section extending outwardly beyond the arc shaped section 38 and adapted to extend over a portion of the core 17 so as to guide the body portion of the web and the side edges or bead portion thereof into contact with the core in the manner to be later set forth. The flexible section 47 preferably comprises a plurality of spaced resilient strips 48 extending longitudinally and rigidly connected at their inner ends to the arc shaped member 38 and transverse resilient elements 49 connected to and extending across the strips 48. The longitudinal elements are formed from metallic strips, whereas the transverse elements 49 preferably comprise sections of resilient wire, such as piano wire, and co-operate with the strips 48 to permit flexing of that portion of the shoe which delivers the web to the core to permit it to conform approximately to the shape of the core and thus deliver the web in shaped condition ready for application thereto. As the delivery end of the shoe is resilient, it tends to expand the web outwardly and thus to hold it out of contact with the core until the web passes the outer or free end of the shoe. Accordingly, I am enabled to hold the body portion away from the core 17 until or following the engagement of the beads therewith and operation of the bead rolling down devices 26$^b$, as shown in Fig. 8. The transverse elements 49 are preferably held in position by providing each strip 48 with a pair of slits 50 and bending the section 50$^a$ of the metal between the slits laterally to form a bearing through which one of the elements 49 extends; the slits being arranged on the several strips to bring the bearings in alignment. By reference, the metal sections between alternate pairs of slits are bent in opposite directions, so that alternate transverse elements 49 are upon opposite sides or faces of the strips 48 (see Fig. 4), the purpose of which will later appear. The opposite ends of the transverse elements 49 may be secured to the outer strips 48 in any desired manner to prevent endwise movement of the elements, as well as to prevent spreading of the strips 48, such securing being preferably provided for by bending the ends of each element 49 around the outer strip as shown at 51 in Fig. 5.

52 indicate devices for maintaining the strips in spaced relation so that when the shoe is flexed by the feeding of the web $d$ to the core 17 it will conform approximately to the shape of the core in cross section rather than become distorted intermediate its side edges. The devices 52 preferably comprise a plurality of sleeves surrounding each of the transverse elements 49, one being interposed between adjoining strips 48 and engaging therewith at its opposite ends—see Fig. 5.

53 indicate rollers each rotatably fitting one of the sleeves 52. By mounting the transverse elements 49 upon opposite sides of the strips 48 I provide spaced anti-friction devices on both the upper and lower surfaces of the delivery section of the shoe. By this arrangement, the rollers on the upper side of the shoe serve as anti-friction devices between the web $d$ and the resilient or flexible section of the shoe as the web slides thereover; whereas the anti-friction devices 53 on the lower surface of the shoe roll on the core 17 as the latter rotates and thus support the delivery end of the shoe and at the same time maintain the free outer end thereof at a predetermined distance from the surface of the core 17. As shown in the drawings the rollers 53 are of less length than the spacing devices 52 so that they may rotate freely thereon without engagement with the side walls of the strips 48 or being wedged therebetween when the shoe is flexed.

As will be understood from Figs. 2 and 7, the supporting and guiding roller 40 is curved longitudinally or from end to end to conform to the transverse shape of the web $d$ as it passes thereover.

From the foregoing description it will be seen that I provide a shoe adapted to so deliver all portions of the material to the winding member that winding thereon may be effected with uniformity and smoothness and at any desired speed, and furthermore the material is guided to the winding member with minimum friction. My shoe construction is particularly adapted for delivering the carcass material to a core since it is resilient and capable of conforming itself to the shape thereof without permitting distortion or wrinkling of the material; this is equally true where the material is of the composite type in which the beads are incorporated therein and the latter are pressed inwardly against the opposite sides of the core. In winding a carcass from material of this character the beads are wound helically in side by side relation and must be rolled down prior to or at the same time as the application of the body portion of the material. In the operation of my shoe I am enabled to guide and support the body portion of the material out of contact with the core until or following the engagement of the bead rolling down devices with the beads to press them against the sides of the core adjacent the bead rings.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the character described, the combination with a supply means for material and a rotating member on which the material is wound, of a flexible shoe disposed between said supply means and said member for delivering the material to the latter.

2. In apparatus of the character described, the combination with a supply means for material and a rotating member on which the material is wound, of a flexible shoe disposed between said supply means and said member for delivering the material to the latter, said shoe comprising spaced longitudinal members and resilient transverse members.

3. In apparatus of the character described, the combination with a supply means for material and a rotating member on which the material is wound, of a flexible shoe disposed between said supply means and said member for delivering the material to the latter, said shoe comprising spaced longitudinal members and resilient transverse members, and spacing means between said longitudinal members.

4. In apparatus of the character described, the combination with a supply means for material and a rotating member on which the material is wound, of a flexible shoe disposed between said supply means and said member for delivering the material to the latter, said shoe comprising a plurality of spaced, relatively movable longitudinally extending members.

5. In apparatus of the character described, the combination with a supply means for material and a rotating member on which the material is wound, of a flexible shoe disposed between said supply means and said member for delivering the material to the latter, said shoe comprising a plurality of outer and intermediate spaced, relatively movable longitudinally extending members and flexible connecting elements between them.

6. In apparatus of the character described, the combination with a supply means for material and a rotating member on which the material is wound, of a flexible shoe disposed between said supply means and said member for delivering the material to the latter, said shoe comprising a plurality of spaced, outer and intermediate relatively movable longitudinally extending members and spaced flexible connecting elements between them.

7. In apparatus of the character described, the combination with a supply means for material and a rotating member on which the material is wound, of a flexible shoe disposed between said supply means and said member for delivering the material to the latter, and anti-friction devices carried by one surface of said flexible shoe.

8. In apparatus of the character described, the combination with a supply means for material and a rotating member on which the material is wound, of a flexible shoe disposed between said supply means and said member for delivering the material to the latter, anti-friction devices carried by the upper surface of the shoe to be engaged by the material as it is guided to said rotating member, and an anti-friction device on the lower surface of said shoe to engage said rotating member.

9. In apparatus of the character described, the combination with a support, supply means for material thereon and a rotating member on which the material is wound, of a flexible shoe pivotally connected at its inner end to said support and adapted to ride on said member and disposed between said supply means and said member for delivering the material to the latter, and anti-friction devices on said shoe with which the material engages as it passes to said member.

10. In apparatus of the character described, the combination with a supply means for material and a rotating member on which the material is wound, of a shoe formed of spaced resilient members and disposed between said supply means and said member for delivering the material to the latter.

11. In apparatus of the character described, the combination with a supply means for material and a rotating member on which the material is wound, of a flexible shoe disposed between said supply means and said member for delivering the material to the latter, said shoe comprising spaced longitudinal members and resilient transverse members, spacing means between said longitudinal members, and rollers mounted on said spacing means.

12. In apparatus of the character described, the combination with a supply means for material and a rotating member on which the material is wound, of guide means disposed between said supply means and said member for delivering the material to the latter, said guide means comprising a pair of arms, a shoe at the outer ends thereof, means for adjusting said shoe on said arms relative to said supply means, and a support arranged intermediate said supply means and said shoe.

13. In apparatus of the character described, the combination with a supply means for material and a rotating member on which the material is wound, of guide means disposed between said supply means and said member for delivering the material to the latter, said guide means comprising a pair of arms, a shoe at the outer ends thereof, a support arranged intermediate said supply means and said shoe, and means for adjusting said intermediate support relative to said supply means and said shoe.

14. In apparatus of the character described, the combination with a supply means for material and a rotating member on which the material is wound, of guide means disposed between said supply means and said member for delivering the material to the latter, said guide means comprising a pair of arms, a shoe at the outer ends thereof, a support arranged intermediate said supply means and said shoe, means for adjusting said intermediate support relative to said supply means, and means for adjusting said shoe relative to said supply means.

15. In apparatus of the character described, the combination with a supply means for material and a rotating member on which the material is wound, of a flexible shoe disposed between said supply means and said member for delivering the material to the latter, and anti-friction means on said shoe arranged to be engaged by the material as it is guided to said member.

16. In apparatus of the character described, the combination with a supply means for material and a rotating member on which the material is wound, of a flexible shoe disposed between said supply means and said member for delivering the material to the latter, and rollers on said shoe arranged to be engaged by the material as it is guided to said member.

17. In apparatus of the character described, the combination with a supply means for material and a rotating member on which the material is wound, of a flexible shoe disposed between said supply means and said member for delivering the material to the latter, said shoe comprising spaced longitudinal members and resilient transverse members, and rollers on said transverse members between said longitudinal members.

18. In apparatus of the class described, the combination with a supply means for material and a rotating member on which the material is wound, of a shoe arranged to deliver the material onto said member, said shoe comprising a plurality of spaced longitudinally and transversely arranged flexible elements connected together and rollers mounted on certain of said elements.

19. An apparatus as claimed in claim 18 in which certain of the rollers are arranged to be engaged by the material and certain thereof are arranged to engage said rotatable member.

In testimony whereof, I have hereunto subscribed my name.

HOWARD I. MORRIS.